(12) United States Patent
Umeda

(10) Patent No.: US 12,020,570 B2
(45) Date of Patent: Jun. 25, 2024

(54) TRANSPORT OPERATION CONTROL APPARATUS, TRANSPORT OPERATION CONTROL METHOD, AND VEHICLE

(71) Applicant: TOYOTA JIDOSHA KABUSHIKI KAISHA, Toyota (JP)

(72) Inventor: Kazuhiro Umeda, Nissin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 257 days.

(21) Appl. No.: 16/806,301

(22) Filed: Mar. 2, 2020

(65) Prior Publication Data

US 2020/0312149 A1 Oct. 1, 2020

(30) Foreign Application Priority Data

Mar. 27, 2019 (JP) .................................. 2019-060060

(51) Int. Cl.
*G06Q 10/0631* (2023.01)
*G06Q 50/40* (2024.01)
*G08G 1/09* (2006.01)
*G08G 1/123* (2006.01)
*G08G 1/133* (2006.01)

(52) U.S. Cl.
CPC ....... *G08G 1/133* (2013.01); *G06Q 10/06312* (2013.01); *G06Q 50/40* (2024.01); *G08G 1/091* (2013.01); *G08G 1/123* (2013.01)

(58) Field of Classification Search
CPC ......... G05D 1/0061; G05D 2201/0212; G08G 1/133; G08G 1/091; G08G 1/123; G08G 1/127; G06Q 10/06312; G06Q 50/30
See application file for complete search history.

(56) References Cited

U.S. PATENT DOCUMENTS

| | | | |
|---|---|---|---|
| 2006/0196385 A1* | 9/2006 | Stromberg | B61B 3/02 104/124 |
| 2012/0105256 A1* | 5/2012 | Hsieh | G08G 1/133 340/994 |
| 2016/0342915 A1* | 11/2016 | Humphrey | G05D 1/0297 |
| 2018/0182181 A1* | 6/2018 | Dolan | G06T 11/60 |
| 2019/0204097 A1* | 7/2019 | Starns | G06Q 10/20 |

FOREIGN PATENT DOCUMENTS

| JP | 2000-264210 A | 9/2000 |
|---|---|---|
| JP | 2002-269671 A | 9/2002 |

* cited by examiner

*Primary Examiner* — James M McPherson
*Assistant Examiner* — Paulo Roberto Gonzalez Leite
(74) *Attorney, Agent, or Firm* — Oblon, McClelland, Maier & Neustadt, L.L.P.

(57) ABSTRACT

A transport operation control apparatus that controls transport operation of a plurality of vehicles traveling a circuit in a single direction along a predetermined path while repeating stopping at each stop on the path executes a step of selecting any vehicle among the plurality of vehicles as a vehicle to return to a depot, and a step of transmitting to the selected vehicle an instruction requesting the selected vehicle to restrict boarding, after the selected vehicle passes a stop at which the selected vehicle stops first subsequently to passing a starting point that is an exit of the depot and before the selected vehicle arrives at a next stop.

9 Claims, 6 Drawing Sheets

TRANSPORT OPERATION CONTROL APPARATUS, TRANSPORT OPERATION CONTROL METHOD, AND VEHICLE

INCORPORATION BY REFERENCE

The disclosure of Japanese Patent Application No. 2019-060060 filed on Mar. 27, 2019 including the specification, drawings and abstract is incorporated herein by reference in its entirety.

BACKGROUND

1. Technical Field

The disclosure relates to a transport operation control apparatus, a transport operation control method, and a vehicle.

2. Description of Related Art

In recent years, research and development on automatic operation of vehicles such as automobiles or trains have been conducted. With such a trend of technical development as a backdrop, the Ministry of Land, Infrastructure, Transport and Tourism carries out test traveling of buses in automatic operation on public roads and pursues study on the future of urban traffic, including verification of the effects of automatic operation technology, necessity of an infrastructure to advance automatic operation of buses, and the like. With such situations as a backdrop, Japanese Patent Application Publication No. 2000-264210 proposes a vehicle traffic system that controls transport operation of vehicles based on an instruction from a control system. The vehicle traffic system includes the control system that controls transport operation of vehicles traveling on a dedicated line based on a specified-transport-quantity schedule diagram, and a waiting place where vehicles are allowed to wait. Traveling of each vehicle is controlled in such a manner that the vehicle arrives at a designated position at a designated time, which is designated by the control system.

SUMMARY

In the vehicle traffic system, to reduce the number of vehicles in service in accordance with the specified-transport-quantity schedule diagram, it is necessary to make one or some of the plurality of vehicles that are traveling on the dedicated line to travel off the dedicated line and wait at the waiting place.

However, when a passenger boards such a vehicle without knowing that the vehicle heads for the waiting place from the dedicated line, it does not always happen that the passenger can alight at a desired stop. When the vehicle goes to the waiting place without going to the stop where the passenger wants to alight, the passenger has no other choice but to alight from the vehicle at a stop where the passenger does not want to alight.

Accordingly, an object of the present disclosure is to allow a vehicle to return to a depot in such a manner that a passenger can alight from the vehicle at a stop where the passenger wants to alight.

To achieve the object, a transport operation control apparatus according to the disclosure is a transport operation control apparatus that controls transport operation of a plurality of vehicles traveling a circuit in a single direction along a predetermined path while repeating stopping at each stop on the path, including: a selector that selects any vehicle among the plurality of vehicles as a vehicle to return to a depot; and an instructor that transmits to the selected vehicle an instruction requesting the selected vehicle to restrict boarding, after the selected vehicle passes a stop at which the selected vehicle stops first subsequently to passing a starting point that is an exit of the depot and before the selected vehicle arrives at a next stop. Thus, it is possible to allow the vehicle to return to the depot in such a manner that a passenger can alight from the vehicle at a stop where the passenger wants to alight.

A transport operation control method according to the disclosure executes the steps of: by a transport operation control apparatus that controls transport operation of a plurality of vehicles traveling a circuit in a single direction along a predetermined path while repeating stopping at each stop on the path, selecting any vehicle among the plurality of vehicles as a vehicle to return to a depot; and transmitting to the selected vehicle an instruction requesting the selected vehicle to restrict boarding, after the selected vehicle passes a stop at which the selected vehicle stops first subsequently to passing a starting point that is an exit of the depot and before the selected vehicle arrives at a next stop. Thus, it is possible to allow the vehicle to return to the depot in such a manner that a passenger can alight from the vehicle at a stop where the passenger wants to alight.

A vehicle according to the disclosure travels a circuit in a single direction along a predetermined path while repeating stopping at each stop on the path. The vehicle includes: a receiver that receives a first instruction requesting the vehicle to return to a depot from a transport operation control apparatus that controls transport operation of the vehicle, and receives a second instruction requesting the vehicle to restrict boarding from the transport operation control apparatus after the vehicle passes a stop at which the selected vehicle stops first subsequently to passing a starting point that is an exit of the depot and before the vehicle arrives at a next stop; and a boarding restrictor that restricts boarding of the vehicle in response to the second instruction. Thus, it is possible to allow the vehicle to return to the depot in such a manner that a passenger can alight from the vehicle at a stop where the passenger wants to alight.

According to the disclosure, it is possible to allow a vehicle to return to a depot in such a manner that a passenger can alight from the vehicle at a stop where the passenger wants to alight.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
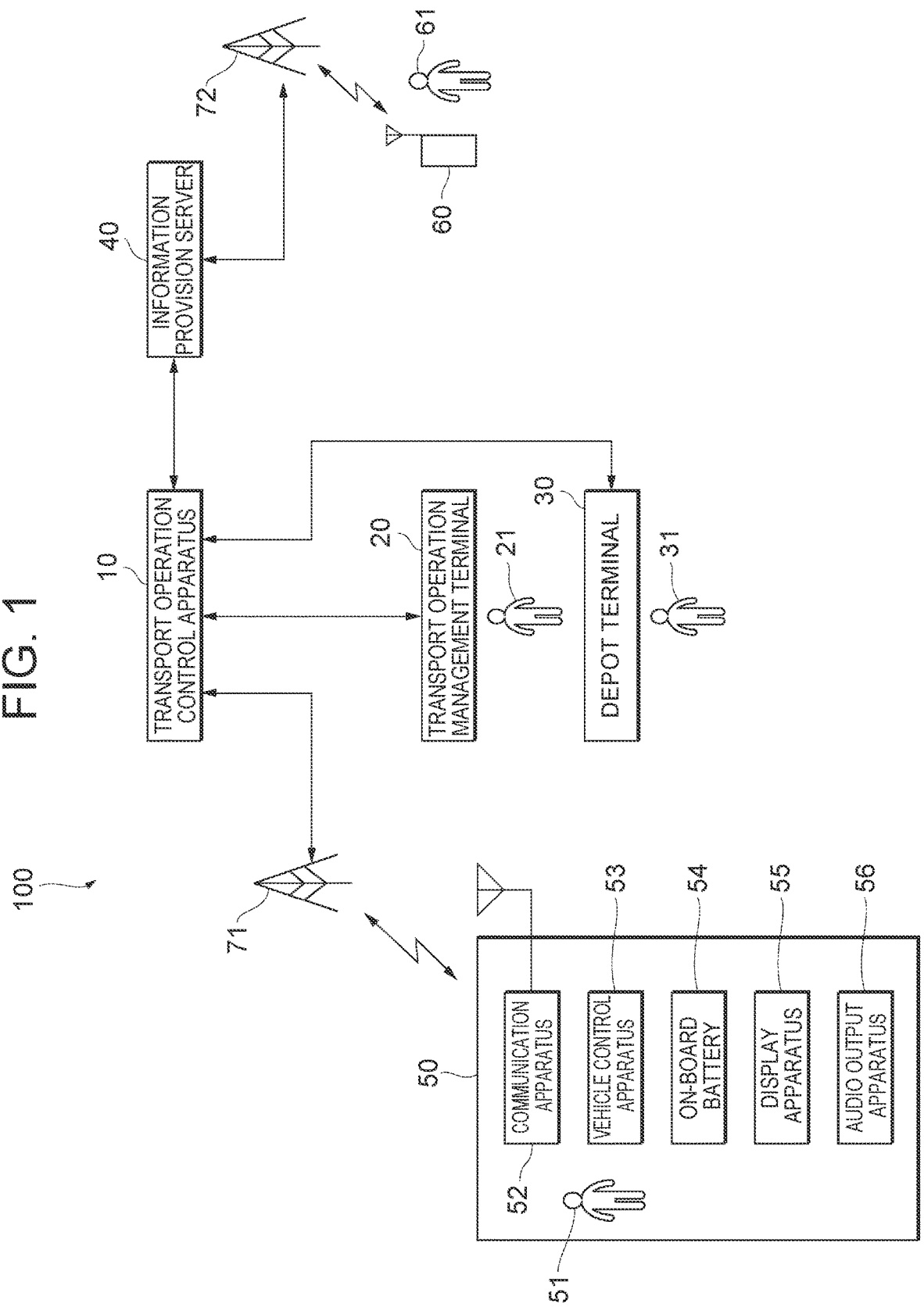
FIG. 1 is an illustrative diagram showing a schematic configuration of a transport operation management system according to an embodiment.

Hereinafter, an embodiment will be described with reference to the drawings. Here, like numerals denote like elements, and an overlapping description will be omitted. FIG. 1 is an illustrative diagram showing a schematic configuration of a transport operation management system 100 according to the embodiment. The transport operation management system 100 manages and controls scheduled transport operation of a vehicle 50 that travels a circuit along a predetermined path. Examples of the vehicle 50 include shared automobiles and trains. The shared automobiles are automobiles that carry many and unspecified passengers and travel along predetermined paths, and include buses (for example, shared buses, regular route buses) and taxies (for example, shared taxies). The trains are railway vehicles that travel along predetermined paths in order to transport people or things. A train may be a single-car train. The vehicle 50 is, for example, an electric vehicle that obtains driving force by driving a motor through consumption of electricity supplied from an on-board battery 54.

The transport operation management system 100 includes a transport operation control apparatus 10, a transport operation management terminal 20, a depot terminal 30, and an information provision server 40. The transport operation control apparatus 10 manages states of a plurality of the vehicles 50 (for example, transport operation states, states-of-charge of the respective on-board batteries 54, and the like), and controls scheduled transport operation of each vehicle 50. The transport operation state of the vehicle 50 indicates whether or not the vehicle 50 is operating as scheduled, or whether or not the vehicle 50 is charging the battery in a depot, and the transport operation state of the vehicle 50 indicates a position and a speed of the vehicle 50 when the vehicle 50 is operating. The state-of-charge of the vehicle 50 indicates, for example, a charged capacity of the on-board battery 54 of the vehicle 50 and presence or absence of an abnormality in charge. The transport operation management terminal 20 receives an instruction for transport operation of the vehicle 50 from a transport operation manager 21 who monitors the transport operation of the vehicle 50. For example, when an abnormality occurs, the transport operation manager 21 can instruct all or at least one of a plurality of the vehicles 50 that are traveling a circuit along the predetermined path to stop. The instruction for transport operation of the vehicle 50 from the transport operation manager 21 is input to the transport operation control apparatus 10 via the transport operation management terminal 20.

The transport operation control apparatus 10 controls the transport operation of each vehicle 50 based on a transport operation schedule prepared in advance, or based on an instruction for transport operation of the vehicle 50 input from the transport operation management terminal 20. The depot terminal 30 receives an instruction about entrance of the vehicle 50 into or exit of the vehicle 50 from the depot from the transport operation control apparatus 10. A maintainer 31 allows the vehicle 50 to enter or exit the depot in accordance with the instruction received by the depot terminal 30. The depot terminal 30 is, for example, a personal computer or a tablet terminal including a communication function. The information provision server 40 receives transport operation information on the vehicle 50 (for example, an estimated time of arrival at each stop, and the like) from the transport operation control apparatus 10 and provides the received transport operation information. The information provision server 40 is, for example, a web server that provides such transport operation information described in hypertext markup language.

The transport operation control apparatus 10 is connected to the transport operation management terminal 20, the depot terminal 30, and the information provision server 40 through a wired network. The instruction for transport operation of the vehicle 50 from the transport operation control apparatus 10 is wirelessly transmitted to the vehicle 50 via a base station 71. The transport operation information on the vehicle 50 from the information provision server 40 is transmitted to a communication terminal 60 of a user 61 via a base station 72. The communication terminal 60 is, for example, a mobile communication terminal (a smartphone, a smartwatch, a tablet terminal, or the like) or a personal computer including a communication function. The user 61 can board the vehicle 50 after checking the transport operation information on the vehicle 50 on the communication terminal 60. The user 61 being on board the vehicle 50 is referred to as passenger.

The vehicle 50 includes a communication apparatus 52, a vehicle control apparatus 53, the on-board battery 54, a display apparatus 55, and an audio output apparatus 56. The communication apparatus 52 transmits and receives information related to control of the transport operation of the vehicle 50 to/from the transport operation control apparatus 10. For example, the communication apparatus 52 receives an instruction for transport operation of the vehicle 50 from the transport operation control apparatus 10. For example, the communication apparatus 52 transmits information indicating a state of the vehicle 50 (for example, a transport operation state, a state-of-charge of the on-board battery 54, or the like) to the transport operation control apparatus 10. The vehicle control apparatus 53 controls operation of the vehicle 50 by switching among a plurality of operation modes (for example, an automatic mode, a semi-automatic mode, a manual mode, and a stop mode). The automatic mode is a mode in which the vehicle 50 automatically operates by responding to an instruction from the transport operation control apparatus 10. The semi-automatic mode is a mode in which the vehicle 50 autonomously operates without receiving an instruction from the transport operation control apparatus 10. The manual mode is a mode in which an on-board operator 51 of the vehicle 50 operates the vehicle 50 through manual operation. The stop mode is a mode in which the operation of the vehicle 50 is stopped.

The vehicle control apparatus 53 includes, for example, a shooting apparatus (for example, a stereo camera) that shoots situations on the front, rear, right, and left sides of the vehicle 50, a locating apparatus (for example, a global positioning system) that detects positional information on the vehicle 50, sensors (for example, millimeter-wave radars) that detect presence or absence of an obstacle around the vehicle 50, an electronic control unit that controls output of the vehicle 50, an electronic control unit that controls a steering angle of the vehicle 50, and an electronic control unit that controls braking of the vehicle 50. The vehicle control apparatus 53 controls the various electronic control units based on an image shot by the shooting apparatus and information detected by the locating apparatus and the sensors, and controls the operation of the vehicle 50 by responding to an instruction for transport operation from the transport operation control apparatus 10. The vehicle control apparatus 53 controls the display apparatus 55 and the audio output apparatus 56 by responding to an instruction from the transport operation control apparatus 10. Details of the display apparatus 55 and the audio output apparatus 56 will be described later.

Note that the locating apparatus that detects the positional information on the vehicle 50 is not limited to the global positioning system, but may be, for example, a combination of LIDAR (Laser Detection and Ranging) and map data. The vehicle control apparatus 53 can detect a current position of the vehicle 50 by using information on surroundings of the vehicle 50 detected by LIDAR and map data around a path 80.

Figure 2:
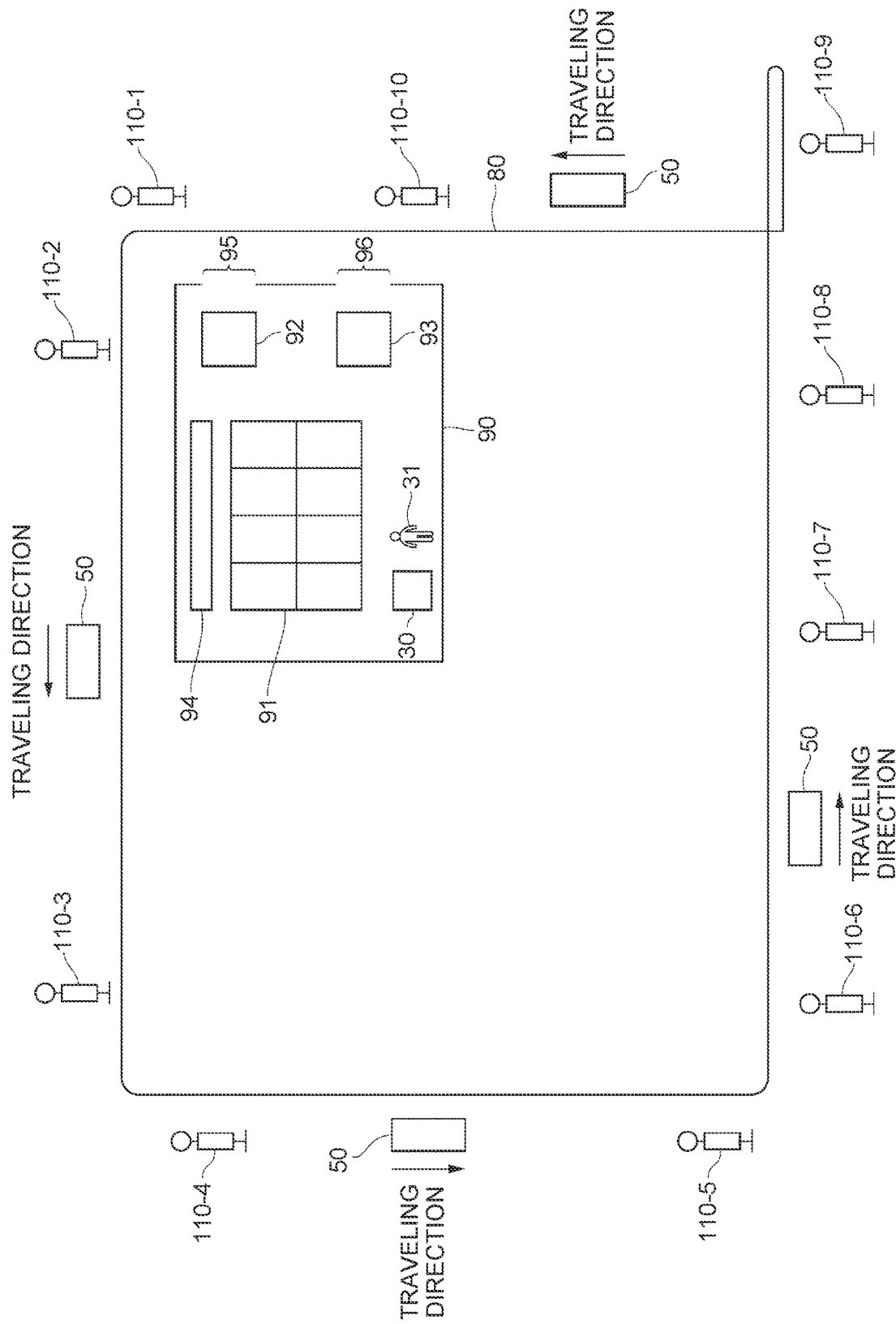
FIG. 2 is an illustrative diagram showing a schematic configuration of a path and a depot according to the embodiment.

FIG. 2 is an illustrative diagram showing a schematic configuration of the path 80 and a depot 90 according to the embodiment. The depot 90 includes a parking section 91 sectioned such that a plurality of the vehicles 50 are parked, a waiting section 92 sectioned such that the vehicle 50 can wait to move from the depot 90 to the path 80, a waiting section 93 sectioned such that the vehicle 50 can wait to move from the path 80 to the depot 90, and a charging facility 94 that charges the on-board battery 54 of the vehicle 50. The waiting section 92 is provided near an exit 95 of the depot 90. The waiting section 93 is provided near an entrance 96 of the depot 90. Control of automatic operation of the vehicle 50 by the transport operation control apparatus 10 starts at a time point when the vehicle 50 starts traveling from the waiting section 92 toward the path 80, and ends at a time point when the vehicle 50 returns from the path 80 and stops at the waiting section 93. The depot terminal 30 is provided to the depot 90. When the depot terminal 30 receives an instruction for exit from the depot from the transport operation control apparatus 10, the maintainer 31 moves the vehicle 50 from the parking section 91 to the waiting section 92 (exit from the depot) through manual operation. When the depot terminal 30 receives an instruction for entrance into the depot from the transport operation control apparatus 10, the maintainer 31 moves the vehicle 50 from the waiting section 93 to the parking section 91 (entrance into the depot) through manual operation. While each vehicle 50 is parked in the parking section 91, the vehicle 50 can charge the on-board battery 54 by receiving electricity supplied from the charging facility 94.

Note that movement of the vehicle 50 from the parking section 91 to the waiting section 92 (exit from the depot) and movement of the vehicle 50 from the waiting section 93 to the parking section 91 (entrance into the depot) may be performed through movement of the vehicle 50 in the semi-automatic mode. The exit 95 and the entrance 96 of the depot 90 may be different ones or may be the same one.

The path 80 is raid out in a closed curve shape such that a plurality of the vehicles 50 can travel a circuit. When the vehicle 50 is a shared automobile, the path 80 is a road. In a road including a plurality of lanes, the path 80 means a lane on which the vehicle 50 travels. When the vehicle 50 is a train, the path 80 is a rail. One or more stops 110 are set on the path 80. Each vehicle 50 stops at each stop 110 and opens and closes a door, regardless of whether or not a passenger boards or alights from the vehicle 50. Each vehicle 50 travels a circuit in a single direction along the path 80 while repeating stopping at each stop 110 on the path 80. When the vehicle 50 is a train, the stop 110 can be referred to as "station". Although the example shown in FIG. 2 illustrates a case where the number of the stops 110 is ten for convenience of explanation, the number of the stops 110 is not limited to ten. If it is not particularly necessary to distinguish the stops from each other, the stops are collectively referred to as stop 110. If it is necessary to distinguish the stops from each other, the stops are referred to as stop 110-1, 110-2, . . . , 110-10. Among the stops 110, particularly the stop 110-1 that is at the shortest distance from the exit 95 of the depot 90 in a vehicle traveling direction is referred to as "farthest stop", and the stop 110-10 that is at the shortest distance from the entrance 96 of the depot 90 in a direction reverse to the vehicle traveling direction is referred to as "closest stop". Stopping order in which the vehicle 50 stops at each stop 110 after a starting point that is the exit 95 of the depot 90 is the stops 110-1, 110-2, . . . , 110-10. The farthest stop 110-1 is a first stop in the stopping order after the starting point that is the exit 95 of the depot 90. The closest stop 110-10 is a last stop in the stopping order after the starting point that is the exit 95 of the depot 90. When the vehicle 50 travels a circuit along the path 80, a stop at which the vehicle 50 stops subsequently to the closest stop 110-10 is the farthest stop 110-1.

Note that the transport operation control apparatus 10 adjusts the number of the vehicles 50 that are traveling a circuit along the path 80, based on the transport operation schedule. For example, the number of the vehicles 50 that are traveling a circuit along the path 80 may be reduced in off-hours during which there are a smaller number of passengers, and the number of the vehicles 50 that are traveling a circuit along the path 80 may be increased in busy hours during which there are a larger number of passengers. For example, the transport operation control apparatus 10 may transmit an instruction to the depot terminal 30 such that any vehicle 50 having a charged capacity less than a threshold value, among a plurality of the vehicles 50 that are traveling on the path 80, enters the depot 90. For example, the transport operation control apparatus 10 may transmit an instruction to the depot terminal 30 such that any vehicle 50 having a charged capacity not less than the threshold value, among a plurality of the vehicles 50 that are parked in the depot 90, travels on the path 80. The transport operation control apparatus 10 can adjust the number of the vehicles 50 that are traveling a circuit along the path 80 by appropriately making an interchange between the vehicle 50 that is traveling on the path 80 and the vehicle 50 that is parked in the depot 90.

Figure 3:
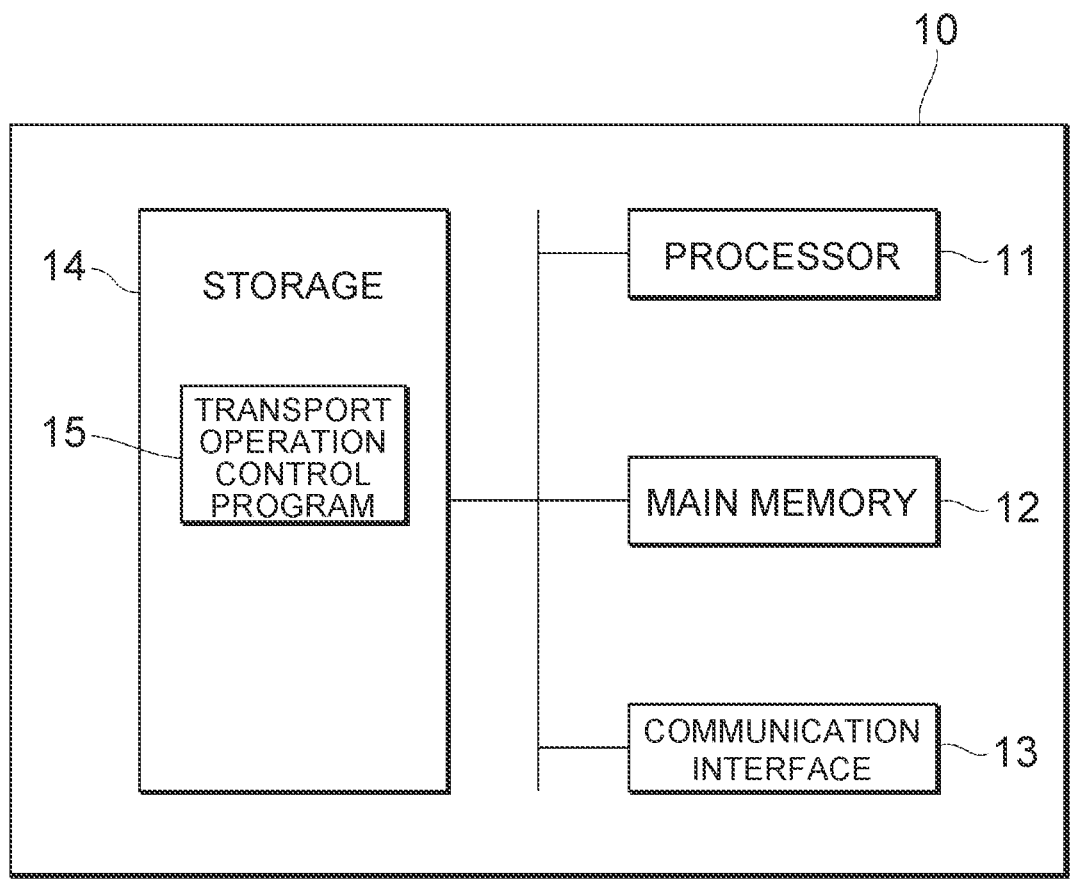
FIG. 3 is an illustrative diagram showing a hardware configuration of a transport operation control apparatus according to the embodiment.

FIG. 3 is an illustrative diagram showing a hardware configuration of the transport operation control apparatus 10 according to the embodiment. The transport operation control apparatus 10 includes a processor 11, a main memory 12, a communication interface 13, and a storage 14. The storage 14 is a computer-readable recording medium such as a disk medium (for example, a magnetic recording medium or a magneto-optical recording medium) or a semiconductor memory (for example, a volatile memory or a nonvolatile memory). Such a recording medium can also be referred to as, for example, a non-transient recording medium. The storage 14 stores a transport operation control program 15 that controls the transport operation of the vehicle 50. The transport operation control program 15 is read from the storage 14 into the main memory 12 and interpreted and executed by the processor 11, whereby a transport operation control method according to the embodiment is executed. Note that the communication interface 13 controls communication between the transport operation control apparatus 10 and the other end of the communication (the vehicle 50, the transport operation management terminal 20, the depot terminal 30, the information provision server 40).

Next, the transport operation control method according to the embodiment will be described with reference to FIGS. 4 to 8. Each vehicle 50 periodically transmits the own positional information to the transport operation control apparatus 10, and the transport operation control apparatus 10 keeps track of the positional information on each vehicle 50. The transport operation control apparatus 10 transmits an instruction for transport operation to each vehicle 50 such that a time interval at which each of a plurality of the vehicles 50 passes an arbitrary point on the path 80 becomes approximately constant. Thus, each vehicle 50 can arrive at each stop 110 at the constant time interval. The time interval thus adjusted to be approximately constant corresponds to a time period obtained by a division of a time period required for the vehicle 50 to travel one lap of the path 80 by the number of the vehicles 50 that are traveling on the path 80, and is referred to as "standard vehicle time interval". Processing of controlling the transport operation of each vehicle 50 such that a time interval at which each of a plurality of the vehicles 50 passes the arbitrary point on the path 80 becomes equal to the standard vehicle time interval is referred to as "time interval equalization processing". In the present description, a time interval between two vehicles means a time period required from when one of the two vehicles passes an arbitrary point until the other vehicle passes the arbitrary point.

Note that in the off-hours during which there are a smaller number of passengers, the standard vehicle time interval is longer because the number of the vehicles 50 that are traveling on the path 80 is reduced. In contrast, in the busy hours during which there are a larger number of passengers, the standard vehicle time interval is shorter because the number of the vehicle 50 that are traveling on the path 80 is increased.

Figure 4:
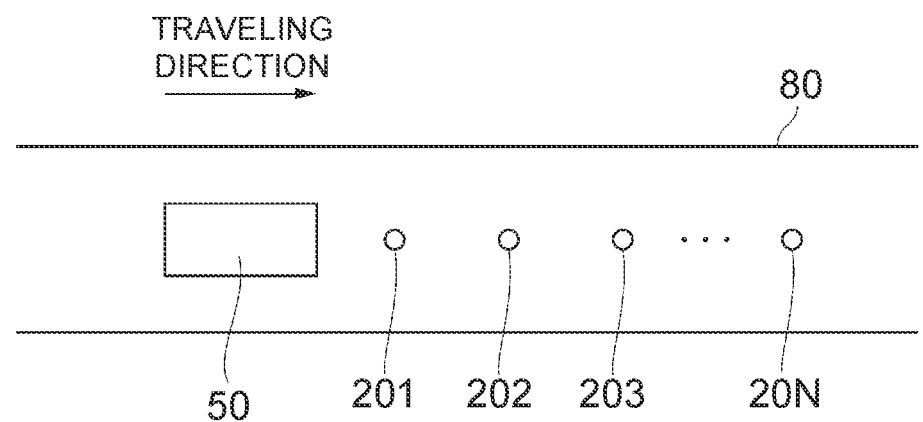
FIG. 4 is an illustrative diagram of a transport operation control method according to the embodiment.

Here, the time interval equalization processing will be described with reference to FIG. 4. Reference signs 201, 202, 203, . . . , 20N represent desired arrival positions of the vehicle 50 at different designated times. For example, reference sign 201 represents a desired arrival position of the vehicle 50 at designated time t0. Reference sign 202 represents a desired arrival position of the vehicle 50 at designated time (t0+t). Reference sign 203 represents a desired arrival position of the vehicle 50 at designated time (t0+2t). Reference sign 20N represents a desired arrival position of the vehicle 50 at designated time $\{t0+(N-1)t\}$. Here, N is an integer not smaller than 2. For example, N may be 10. Time t0 is a time at which a time period t has passed since the present time. The time period t is an arbitrary time period. For example, the time period t may be one second. The desired arrival positions of the vehicle 50 at designated time t0, (t0+t), (t0+2t), . . . , $\{t0+(N-1)t\}$ are calculated such that the time interval at which each of a plurality of the vehicles 50 passes the arbitrary point on the path 80 becomes equal to the standard vehicle time interval. The transport operation control apparatus 10 transmits the desired arrival positions of the vehicle 50 at designated time t0, (t0+t), (t0+2t), . . . , $\{t0+(N-1)t\}$ as an instruction for transport operation to the vehicle 50.

The vehicle 50 having received the desired arrival positions as an instruction for transport operation adjusts speed such that the vehicle 50 can arrive at the desired arrival positions at the designated times. A steady speed and a maximum speed of the vehicle 50 are predetermined. The steady speed is, for example, 10 km/h, and the maximum speed is, for example, 19 km/h. When the vehicle 50 cannot arrive at a desired arrival position at a corresponding designated time at the steady speed, the vehicle 50 may accelerate within a safely accelerable range. When the distance of the vehicle 50 to a vehicle ahead is shorter than a threshold value even if the vehicle 50 can arrive at a desired arrival position at a corresponding designated time at the steady speed, the vehicle 50 may travel at a lower speed. The vehicle 50 does not necessarily need to arrive at each desired arrival position at each corresponding designated time, and may travel at a speed at which the vehicle 50 can safely travel.

Note that the standard vehicle time interval is changed in some cases, depending on an increase or a decrease in the number of the vehicles 50 that are traveling on the path 80. In such a case, each vehicle 50 may cancel an instruction for transport operation received before the standard vehicle time interval is changed, and may travel in accordance with an instruction for transport operation received after the standard vehicle time interval is changed. When a desired arrival position of the vehicle 50 at a corresponding designated time is located behind a current position of the vehicle 50 in the traveling direction, the vehicle 50 may gradually decelerate without abruptly stopping or traveling backward.

Figure 5:
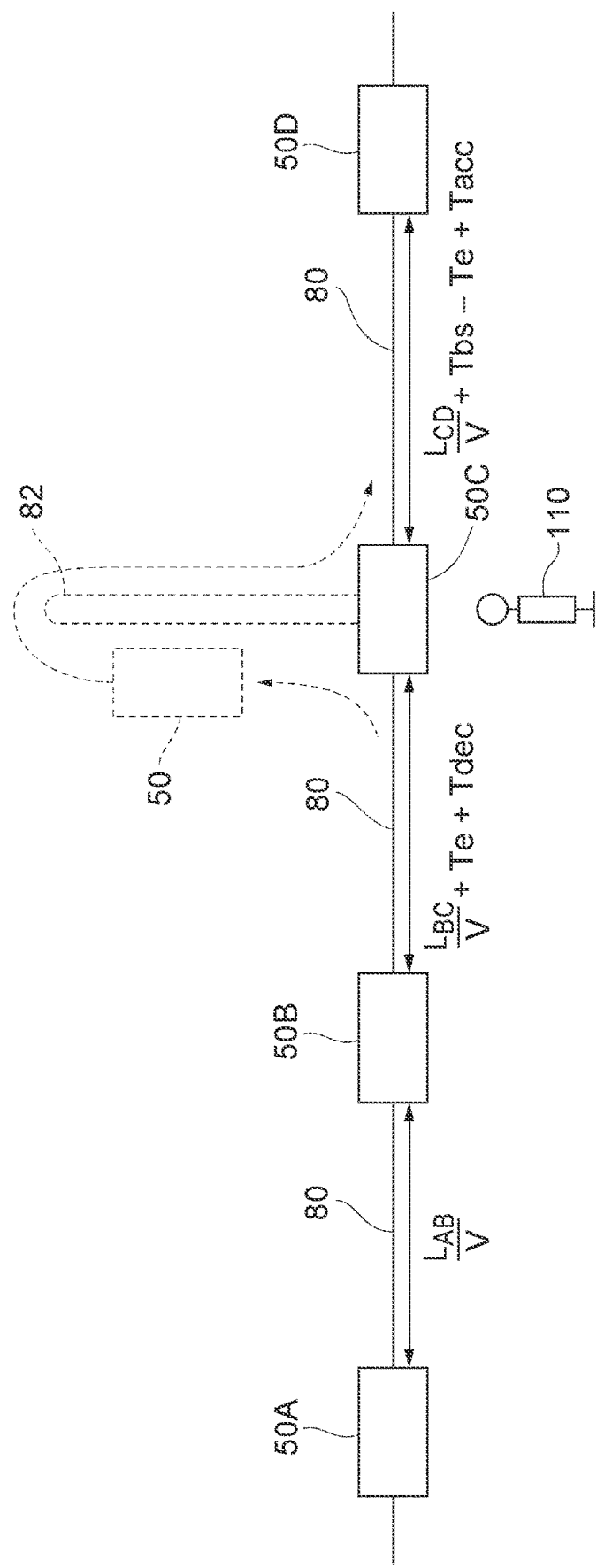
FIG. 5 is an illustrative diagram of the transport operation control method according to the embodiment.

Next, a detailed description will be added to the standard vehicle time interval with reference to FIG. 5. For convenience of explanation, when four vehicles 50 that are traveling on the path 80 are distinguished from each other, the vehicles 50 are referred to as vehicle 50A, vehicle 50B, vehicle 50C, and vehicle 50D. When the four vehicles 50 are not distinguished from each other, the vehicles 50 are collectively referred to as vehicle 50. The length of one lap of the path 80 is assumed to be L. The steady speed of the vehicle 50 is assumed to be V. The number of the vehicles 50 that are traveling on the path 80 is assumed to be Nv. In the example shown in FIG. 5, Nv=4. A mean time period for which the vehicle 50 stops at a stop 110 is assumed to be Tbs. An actual time period for which the vehicle 50 stops at a stop 110 is assumed to be Te. A time period required for the speed of the vehicle 50 to become zero from the steady speed by the vehicle 50 decelerating in order to stop at a stop 110 is assumed to be Tdec. A time period required for the speed of the vehicle 50 to become the steady speed from zero after the vehicle 50 departs from a stop 110 is assumed to be Tacc. The distance between the vehicle 50A and the vehicle 50B is assumed to be $L_{AB}$. The distance between the vehicle 50B and the vehicle 50C is assumed to be $L_{BC}$. The distance between the vehicle 50C and the vehicle 50D is assumed to be $L_{CD}$. Note that it is assumed that an imaginary extended path 82 is extended from each stop 110, and that the vehicle 50 virtually continues traveling on the extended path 82 at the steady speed while the vehicle 50 stops at a stop 110. The length of the extended path 82 is Tbs×V.

The time interval between the vehicle 50A and the vehicle 50B is $L_{AB} \div V$. The time interval between the vehicle 50B and the vehicle 50C is $L_{BC} \div V + Te + Tdec$. The time interval between the vehicle 50C and the vehicle 50D is $L_{CD} \div V + Tbs - Te + Tacc$.

The sum of Tbs at all stops 110 on the path 80 is assumed to be σ1. The sum of Tdec at all stops 110 on the path 80 is assumed to be σ2. The sum of Tacc at all stops 110 on the path 80 is assumed to be σ3. The standard vehicle time interval is assumed to be Ts. In such a case, $Ts=(L \div V + \sigma1 + \sigma2 + \sigma3) \div Nv$.

Here, attention will be focused on the vehicle 50B among the plurality of vehicles 50, and it is assumed that the time interval between the vehicle 50C traveling ahead of the vehicle 50B and the vehicle 50B is Tf and the time interval between the vehicle 50A traveling behind the vehicle 50B and the vehicle 50B is Tb. When Tf≥Ts and when Tb≥Ts, the transport operation control apparatus 10 transmits an instruction for transport operation to the vehicle 50B such that the vehicle 50B can arrive at a desired arrival position at a designated time while maintaining the steady speed. Similarly, when Tf<Ts and when Tb<Ts, the transport operation control apparatus 10 transmits an instruction for transport operation to the vehicle 50B such that the vehicle 50B can arrive at the desired arrival position at the designated time while maintaining the steady speed. In contrast, when Tf≥Ts and when Tb<Ts, the transport operation control apparatus 10 transmits an instruction for transport operation to the vehicle 50B such that the vehicle 50B can arrive at the desired arrival position at the designated time at a higher speed than the steady speed. When Tf<Ts and when Tb≥Ts, the transport operation control apparatus 10 transmits an instruction for transport operation to the vehicle 50B such that the vehicle 50B can arrive at the desired arrival position at the designated time at a lower speed than the steady speed.

Next, processing of allowing any vehicle 50 among a plurality of the vehicles 50 that are traveling a circuit along the path 80 to return to the depot 90 will be described with reference to FIGS. 6 to 8.

Figure 6:
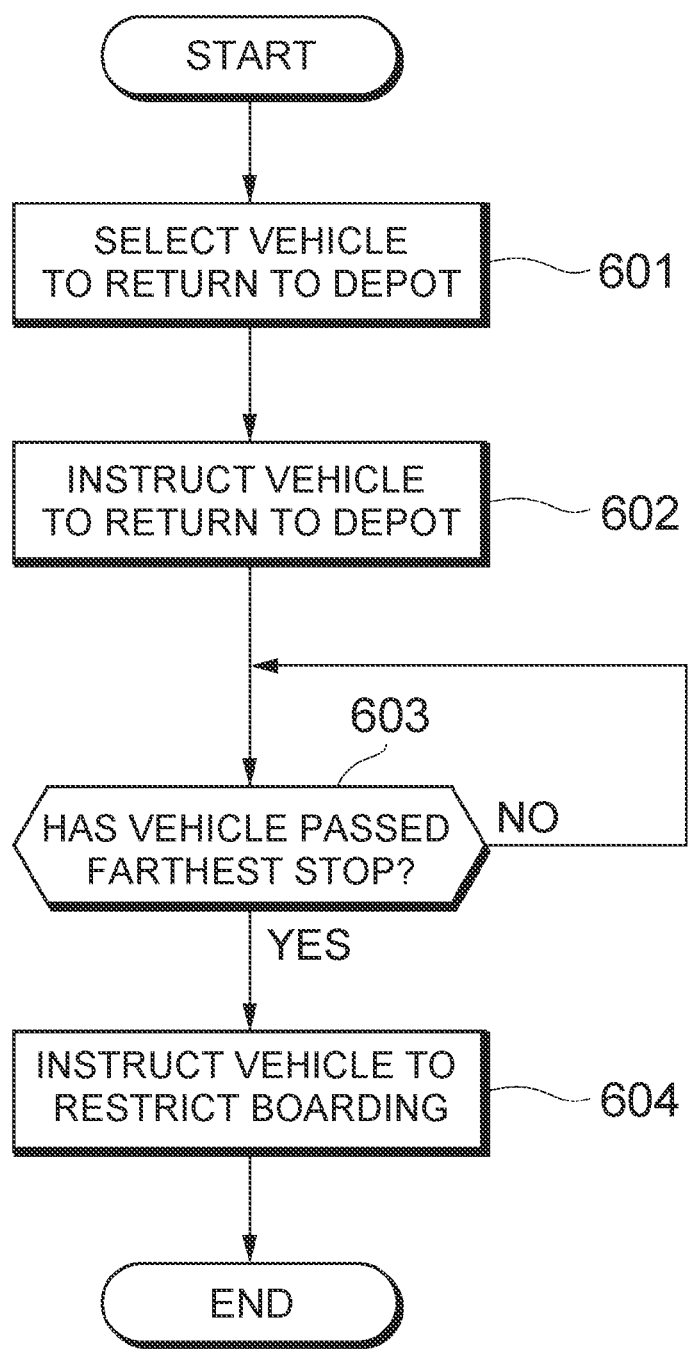
FIG. 6 is a flowchart showing a flow of processing related to the transport operation control method according to the embodiment.

FIG. 6 is a flowchart showing a flow of processing related to the transport operation control method according to the embodiment.

In step 601, the transport operation control apparatus 10 selects any vehicle 50 among the plurality of vehicles 50 as a vehicle to return to the depot 90. Among the plurality of vehicles 50 that are traveling on the path 80, the transport operation control apparatus 10 may select, for example, any vehicle 50 having a charged capacity less than the threshold value as a vehicle to return to the depot 90. The transport operation control apparatus 10 may select any vehicle 50 among the plurality of vehicles 50 that are traveling on the path 80 as a vehicle to return to the depot 90, for example, in order to reduce the number of vehicles in service based on a predetermined transport operation schedule. Among the plurality of vehicles 50 that are traveling on the path 80, the transport operation control apparatus 10 may select, for example, any vehicle 50 with which an abnormality (for example, such a minor abnormality that does not disrupt traveling) occurs as a vehicle to return to the depot 90. The transport operation control apparatus 10 may select any vehicle 50 among the plurality of vehicles 50 that are traveling on the path 80 as a vehicle to return to the depot 90, for example, in response to an instruction from the transport operation manager 21. Note that the number of vehicles 50 selected as a vehicle to return to the depot 90 is not limited to one, but two or more vehicles 50 may be selected.

In step 602, the transport operation control apparatus 10 transmits to the vehicle 50 selected in step 601 an instruction requesting the vehicle 50 to return to the depot 90. Although the example shown in FIG. 2 illustrates a case where there is one depot 90, when there are a plurality of depots 90, the transport operation control apparatus 10 may notify the vehicle 50 selected in step 601 of identification information on a depot 90 to which the vehicle 50 returns. The vehicle 50 having received the instruction requesting the vehicle 50 to return to the depot 90 returns to the depot 90 after traveling at least one lap of the path 80. For example, when a vehicle 50 traveling between the stops 110-2, 110-3 receives the instruction requesting the vehicle 50 to return to the depot 90, the vehicle 50 does not return to the depot 90 after passing the stops 110-3, 110-4, . . . , 110-10 but returns to the depot 90 after traveling at least one lap of the path 80.

In step 603, the transport operation control apparatus 10 determines whether or not the vehicle 50 selected in step 601 has passed the farthest stop 110-1.

In step 604, after the vehicle 50 selected in step 601 passes the farthest stop 110-1 and before the vehicle 50 arrives at the next stop 110-2, the transport operation control apparatus 10 transmits to the vehicle 50 selected in step 601 an instruction requesting the vehicle 50 to restrict boarding. The instruction requesting the vehicle 50 to restrict boarding may include a request to notify a user that the vehicle 50 selected in step 601 restricts boarding.

In step 604, the transport operation control apparatus 10 may also transmit, to each of the stops 110-2, 110-3, . . . , 110-10 at which the vehicle 50 selected in step 601 stops after passing the stop 110-1 that is the first stop in the stopping order after the starting point that is the exit 95 of the depot 90, an instruction requesting the stop 110 to notify a user that the vehicle 50 selected in step 601 restricts boarding. Note that each stop 110 may include a communication apparatus that receives an instruction from the transport operation control apparatus 10 through a wired or wireless network, and a boarding restrictor that notifies boarding restriction to a user in response to the instruction from the transport operation control apparatus 10. Functions of the boarding restrictor are similar to functions of the display apparatus 55 and the audio output apparatus 56, which will be described later.

Figure 7:
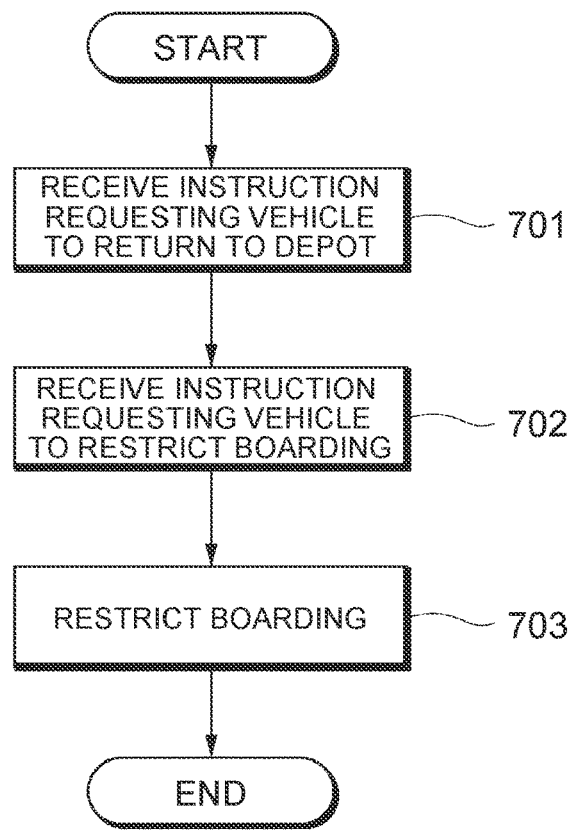
FIG. 7 is a flowchart showing a flow of processing of returning to a depot according to the embodiment.

FIG. 7 is a flowchart showing a flow of processing of returning to the depot according to the embodiment.

In step 701, a vehicle 50 receives an instruction requesting the vehicle 50 to return to the depot 90 from the transport operation control apparatus 10.

In step 702, the vehicle 50 receives an instruction requesting the vehicle 50 to restrict boarding from the transport operation control apparatus 10. The instruction is transmitted from the transport operation control apparatus 10 to the vehicle 50 after the vehicle 50 passes the farthest stop 110-1 and before the vehicle 50 arrives at the next stop 110-2. The instruction requesting the vehicle 50 to restrict boarding may include a request to notify a user that the vehicle 50 having received the instruction requesting the vehicle 50 to return to the depot in step 701 restricts boarding.

In step 703, the vehicle 50 notifies a user 61 that the vehicle 50 restricts boarding, in response to the instruction received in step 702.

Thus, the vehicle 50 having received the instruction requesting the vehicle 50 to return to the depot 90 allows a user 61 to board the vehicle 50 at the farthest stop 110-1, but restricts boarding while allowing a user 61 to alight from the vehicle 50 from the stop 110-2 subsequent to the farthest stop 110-1 up to the closest stop 110-10.

Figure 8:
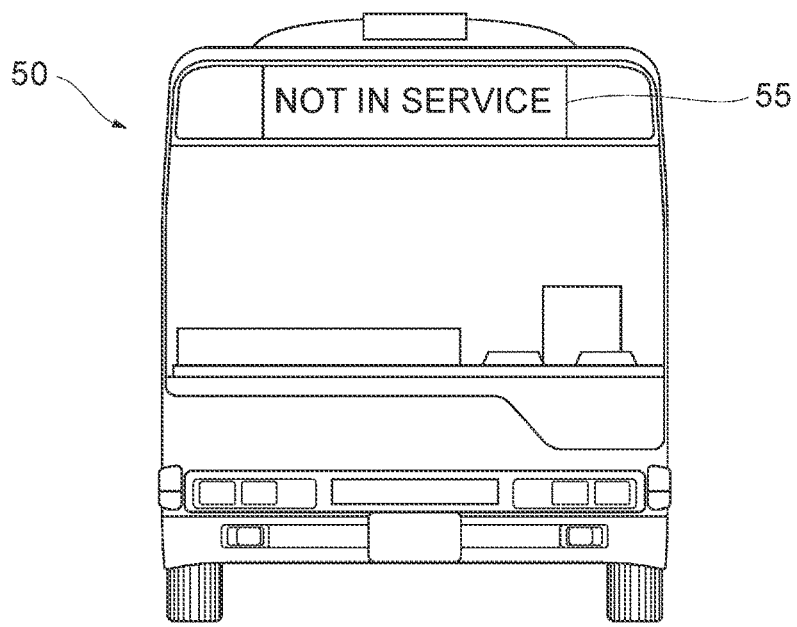
FIG. 8 is an illustrative diagram of a vehicle according to the embodiment.

As shown in FIG. 8, the vehicle 50 may notify a user 61 that the vehicle 50 restricts boarding by, for example, displaying "NOT IN SERVICE" in text form on the display apparatus 55. The display apparatus 55 is, for example, an electronic sign board. Although the display apparatus 55 is attached to a front face of the vehicle 50 such as to be seen from a user 61 waiting at each stop 110 in the example shown in FIG. 8, the display apparatus 55 may be attached to a rear face, a right side face, or a left side face of the vehicle 50, or may also be attached inside the vehicle 50 such as to be seen from a user 61 who is on board the vehicle 50. Besides "NOT IN SERVICE", any other similar phrase may be used for a phrase to notify a user 61 that the vehicle 50 restricts boarding, and a plurality of foreign languages may also be concurrently displayed such that foreigners can also understand. For example, the vehicle 50 may also output from the audio output apparatus 56 an audio guidance to the effect that "this vehicle will enter the depot; passengers are not allowed to board", toward a user 61 waiting at each stop 110.

When the vehicle 50 returns to the waiting section 93 in the depot 90, the operation mode of the vehicle 50 switches from the automatic mode to the manual mode. The on-board operator 51 visually checks whether or not all users 61 on board the vehicle 50 have alighted from the vehicle 50 and thereafter parks the vehicle 50 in the parking section 91 through manual operation. Note that the transport operation manager 21 may check whether or not all users 61 on board the vehicle 50 have alighted from the vehicle 50 through image recognition by a camera installed inside the vehicle 50 and, when a user 61 remains in the vehicle 50, may urge the user 61 to go out of the vehicle 50 with voice over an interphone.

According to the embodiment, a vehicle 50 having received an instruction requesting the vehicle 50 to return to the depot 90 allows a user 61 to board the vehicle 50 at the farthest stop 110-1, but restricts boarding while allowing a user 61 to alight from the vehicle 50 from the stop 110-2 subsequent to the farthest stop 110-1 up to the closest stop 110-10, whereby it is possible to allow the vehicle 50 to return to the depot 90 in such a manner that a passenger can alight from the vehicle 50 at a stop 110 where the passenger wants to alight.

Note that the transport operation control apparatus 10 functions as means for executing the transport operation control method (steps 601 to 604 in FIG. 6) (a selector that executes step 601, an instructor that executes steps 602, 604, a determiner that executes step 603). Such means does not necessarily need to be implemented through cooperation between hardware resources of the transport operation control apparatus 10 and the transport operation control program 15, and may be implemented by using, for example, a hardware resource dedicated to the transport operation control apparatus 10 (for example, an application specific integrated circuit (ASIC), a field programmable gate array (FPGA), or the like).

Moreover, various hardware resources of each vehicle 50 (for example, the communication apparatus 52, the vehicle control apparatus 53, the display apparatus 55, and the audio output apparatus 56) function as means for executing the processing of returning to the depot (steps 701 to 703 in FIG. 7). For example, the communication apparatus 52 functions as a receiver that executes steps 701, 702. The vehicle control apparatus 53, the display apparatus 55, and the audio output apparatus 56 function as a boarding restrictor that executes step 703. For the boarding restrictor that notifies a user 61 that the vehicle 50 restricts boarding, for example, any one of the display apparatus 55 and the audio output apparatus 56 may be used, and the display apparatus 55 and the audio output apparatus 56 do not necessarily need to be used in combination.

The embodiment described above is intended to facilitate understating of the disclosure and should not be construed as limiting the disclosure. Changes and improvements may be made to the disclosure without departing from the scope of the disclosure, and the disclosure includes its equivalents.

What is claimed is:

1. A transport operation control apparatus that controls transport operation of a plurality of vehicles traveling a circuit in a single direction along a predetermined path while repeating stopping at each stop on the path, comprising:
   a processor that selects any vehicle among the plurality of vehicles as a vehicle to return to a depot and causes transmission to the selected vehicle of an instruction requesting the selected vehicle to return to the depot and a further instruction requesting the selected vehicle to restrict boarding, after the selected vehicle passes a stop at which the selected vehicle stops first subsequently to passing a starting point that is an exit of the depot and before the selected vehicle arrives at a next stop,
   wherein the further instruction requesting the selected vehicle to restrict boarding includes an instruction requesting the selected vehicle to stop and allow a user to alight from the selected vehicle and to restrict boarding to the selected vehicle at all stops among stops from the next stop subsequent to the stop at which the selected vehicle stops first subsequently to passing the starting point that is the exit of the depot up to a last stop in a stopping order after the starting point, and
   wherein the instruction requesting the selected vehicle to return to the depot includes an instruction requesting the selected vehicle to return to the depot after traveling at least one lap of the path.

2. The transport operation control apparatus according to claim 1, wherein the further instruction requesting the selected vehicle to restrict boarding includes a request to notify a user that the selected vehicle restricts boarding.

3. The transport operation control apparatus according to claim 1, wherein the processor transmits, to each stop at which the selected vehicle stops after the selected vehicle passes the stop at which the selected vehicle stops first subsequently to passing the starting point that is the exit of the depot, an instruction requesting the stop to notify a user that the selected vehicle restricts boarding.

4. The transport operation control apparatus according to claim 1, wherein the processor selects any vehicle among the plurality of vehicles as a vehicle to return to the depot, in order to reduce the number of the plurality of vehicles in service traveling a circuit along the path based on a predetermined transport operation schedule.

5. The transport operation control apparatus according to claim 1, wherein among the plurality of vehicles, the processor selects any vehicle having a charged capacity less than a threshold value as a vehicle to return to the depot.

6. A transport operation control method, the method executing the steps of:
   by a transport operation control apparatus that controls transport operation of a plurality of vehicles traveling a circuit in a single direction along a predetermined path while repeating stopping at each stop on the path,
   selecting any vehicle among the plurality of vehicles as a vehicle to return to a depot; and
   transmitting to the selected vehicle an instruction requesting the selected vehicle to return to the depot and a further instruction requesting the selected vehicle to restrict boarding, after the selected vehicle passes a stop at which the selected vehicle stops first subsequently to passing a starting point that is an exit of the depot and before the selected vehicle arrives at a next stop,
   wherein the further instruction requesting the selected vehicle to restrict boarding includes an instruction requesting the selected vehicle to stop and allow a user to alight from the selected vehicle and to restrict boarding to the selected vehicle at all stops among stops from the next stop subsequent to the stop at which the selected vehicle stops first subsequently to passing the starting point that is the exit of the depot up to a last stop in a stopping order after the starting point, and wherein the instruction requesting the selected vehicle to return to the depot includes an instruction requesting the selected vehicle to return to the depot after traveling at least one lap of the path.

7. A vehicle that travels a circuit in a single direction along a predetermined path while repeating stopping at each stop on the path, comprising:
 a device that receives a first instruction requesting the vehicle to return to a depot from a transport operation control apparatus that controls transport operation of the vehicle, and receives a second instruction requesting the vehicle to restrict boarding from the transport operation control apparatus after the vehicle passes a stop at which the selected vehicle stops first subsequently to passing a starting point that is an exit of the depot and before the vehicle arrives at a next stop,
 wherein the second instruction requesting the vehicle to restrict boarding includes an instruction requesting the vehicle to stop and allow a user to alight from the vehicle and to restrict boarding to the selected vehicle at all stops among stops from the next stop subsequent to the stop at which the vehicle stops first subsequently to passing the starting point that is the exit of the depot up to a last stop in a stopping order after the starting point, and
 wherein the first instruction requesting the vehicle to return to a depot includes an instruction requesting the vehicle to return to the depot after traveling at least one lap of the path; and
 a boarding restrictor that restricts boarding of the vehicle in response to the second instruction.

8. The transport operation control apparatus according to claim 1, wherein the further instruction requesting the selected vehicle to restrict boarding further instructs the selected vehicle to stop at all stops at which the selected vehicle arrives after the further instruction requesting the selected vehicle to restrict boarding is transmitted, to allow the user of the selected vehicle to alight, and to restrict boarding to the selected vehicle.

9. The transport operation control apparatus according to claim 1, wherein, before the further instruction requesting the selected vehicle to restrict boarding is transmitted, the selected vehicle allows boarding of the selected vehicle at stops at which the selected vehicle arrives.

* * * * *